March 21, 1939.  H. J. PARDEE  2,151,143

CONTROL MEANS FOR CHLORINATORS

Filed Sept. 2, 1936  2 Sheets-Sheet 1

Inventor
Howard J. Pardee,
By A. Ponack
Attorneys

Inventor
Howard J. Pardee,
A. Ponack
By
Attorney

Patented Mar. 21, 1939

2,151,143

UNITED STATES PATENT OFFICE 2,151,143

CONTROL MEANS FOR CHLORINATORS

Howard J. Pardee, New York, N. Y.

Application September 2, 1936, Serial No. 99,137

13 Claims. (Cl. 210—28)

The present invention relates to apparatus particularly adapted to provide and control a flow or feed of gas from a source of supply, usually under pressure, to a body of water or the like to be treated. According to a preferred use of the apparatus, chlorine may be the treating gas, so that the apparatus may aptly be termed chlorinating apparatus.

The gas is conveniently applied in the form of an aqueous solution to the material being treated. Accordingly, the apparatus comprises means, usually in the form of an injector or aspirator, for admixing the gas with water, forming a solution thereof, and delivering the solution to the point of application.

In apparatus of the character described, it usually requires about fifty gallons of water to dissolve one pound of chlorine. On large sewage treating jobs, for example, water costs about 20¢ per thousand gallons. The cost of chlorine is about 2¢ per pound. It is thus apparent that the cost of water in chlorinating installations is not an inconsiderable item, a fact which is often lost sight of, the chlorine being commonly considered as the expensive material. However, it follows from the foregoing that the water cost corresponding to a chlorine cost of 2¢ is 1¢, and this constitutes an appreciable cost factor in large plants. Moreover, it must be borne in mind that as the amount of chlorine feed decreases, there is a corresponding increase in the amount and the cost of the water. In addition, the injector choke takes more water as the chlorine feed decreases. It is therefore apparent that a water control which corresponds substantially to the chlorine flow is essential.

Another factor of importance in apparatus of the character in question is the attainment of complete dissolution of the chlorine. For this purpose, it is essential to provide a control which will insure a sufficient flow of water to and through the injector to completely dissolve the chlorine being fed.

A further desirable control is one assuring a sufficient supply of water to adequately operate the injector choke, since on low chlorine flows the supply of water to the latter may be inadequate for its efficient operation.

Since proportioning of the water supply reduces the power available at the solution device or injector at a rate which is much more rapid than the rate at which the volume of water is reduced, it is also desirable to provide means whereby the said power can be reduced only proportionately to the quantity of water passing.

Accordingly, the present invention provides novel relationships and arrangements of parts whereby the following features are insured:

(a) That the quantity of water used is the minimum amount which will operate the chlorinator satisfactorily;

(b) That there is at least a proportional flow of water:chlorine, so that all the chlorine will be dissolved;

(c) That there will be sufficient water passing through the chlorine device to enable the latter to take care of the chlorine feed; and (d) That the power available at the solution device is reduced only proportionately to the quantity of water passing therethrough.

The invention will be understood by those skilled in the art from the following detailed description thereof, reference being had to the accompanying sheets of drawings wherein the novel relationships and arrangements of parts according to the present invention are set forth in diagrammatic manner.

On the said sheets of drawings.

Figure 1:
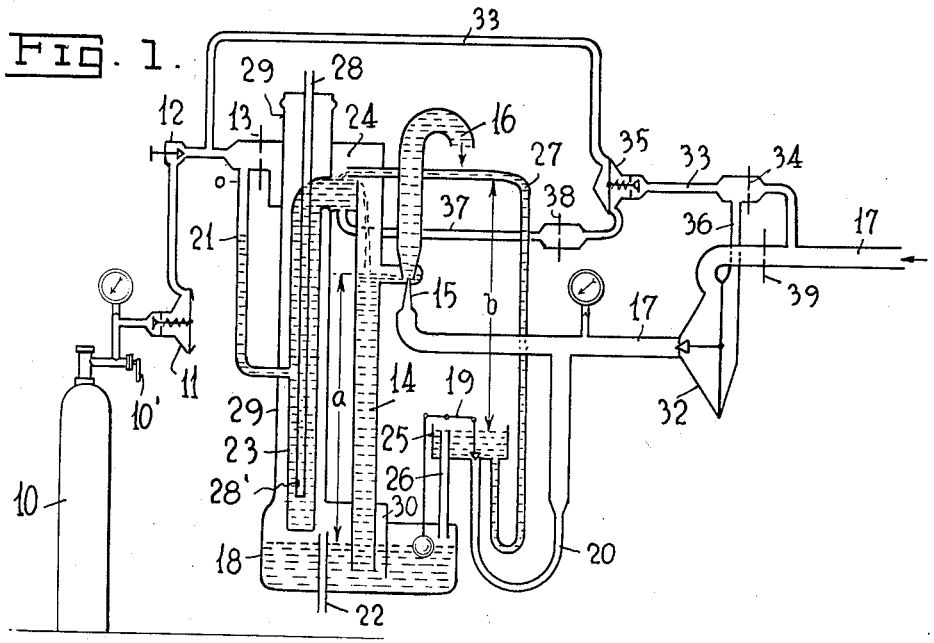
Fig. 1 is a diagrammatic representation of one embodiment of the invention.

Referring now to the drawings, and more particularly at first to Figure 1 thereof, reference numeral 10 designates a source of gas, e. g. chlorine, under pressure. The gas flows from source 10, shown on the drawings as a tank, to vacuum valve 11 of the diaphragm type, which valve admits chlorine to maintain a constant slight vacuum on its diaphragm. At this slight vacuum, the gas flows to and through a variable orifice, or control valve, 12, through a calibrated indicating or meter orifice 13, to a riser 14, from which a water-operated aspirator or injector 15 draws the chlorine and discharges it at 16 as a solution.

From 16, the solution is conveyed to the point of application in any suitable and/or conventional manner. Water for operating the injector 15 is supplied from any suitable source of supply, and is primarily delivered at 17. The bottom of riser 14 is sealed in water reservoir 18, the level in which is maintained by a float-controlled water valve 19, water being supplied as required through conduit 20, connected to the water supply 17, as shown.

Orifice 13 is associated with a meter tube comprising a front leg 21, provided with a suitable scale, and a back leg which assumes the form of a well 23 which extends to the meter overflow chamber 24 which overflows into riser 14.

Float valve 19 for water reservoir 18 is located above the latter, and preferably comprises a box 25 overflowing through conduit 26 into reservoir 18. From a point in box 25, below the water level, a conduit 27 connects to overflow chamber 24 of the meter.

The height "b" from the float valve box 25 to the meter overflow chamber 24 is less than the height "a" from the water reservoir 18 to the injector 15, so that water will be drawn from the float valve box 25 to the meter overflow chamber 24 in preference to being drawn up riser 14. As a result, the water passing through float valve box 25 will, to the capacity of connecting conduit 27, flow to and over the meter overflow into riser 14, rather than to water reservoir 18 and thence to riser 14. This arrangement results in a small supply of water being constantly introduced into the meter overflow 24, supplying the meter and causing a continuous small overflow into riser 14. This definitely and exactly maintains the level of the back leg of the meter, with the meter zero level. In this way, an absolutely constant zero level is obtained. Once the scale is set to this level, the setting is permanent until the apparatus is disassembled. Periodic adjustments of this level are not required. Conduit 27 may preferably be carried below the level of water reservoir 18 to provide a trap, which prevents an excess amount of water being drawn in through the meter overflow.

When meter overflow chamber 24 is empty, as it is when the apparatus is originally set up, the vacuum relief will become unsealed and it will be necessary to prime the relief before the requisite vacuum can be built up in the chlorinator. This may be accomplished by stopping the end of vacuum relief tube 28, which is exposed at the entrance of the vent discharge tube 29, usually with the finger, until water has risen in the meter, indicating that overflow chamber 24 has been filled.

If, through any failure of any part of the mechanism to function, chlorine enters the apparatus in such amount that the injector cannot take it away, this excess of gas will depress the water level in riser 14 and will escape from the bottom of the latter. A hood 30 is provided in water reservoir 18 around riser 14, and from this hood the vent tube 29 leads upwardly, housing within it the vacuum relief, hereinafter described. The chlorine gas escaping through conduit 29 may be led to any suitable point of discharge.

When the chlorine supply from tank 10 is shut off, the chlorine remaining in the chlorinator will slowly dissolve in the water in riser 14. As it dissolves, it will draw the water up to replace itself and, in this way, water may be drawn back through orifices 13 and 12 and even into the connections to the chlorinator. Although the apparatus is preferably suitably and completely protected against moist chlorine back to chlorine shut-off valve 10', e. g. by lining the parts with resistant material, such water will always entrain some fouling material which, in the smaller machines especially, may result in subsequent errors in operation. Accordingly, the chlorinator apparatus of the present invention is provided with a vacuum relief which will admit air if the water starts to rise above a certain point in riser 14. The well 23, which opens into chamber 24, is kept full of water from the latter. Vacuum relief tube 28 extends into well 23 which is sealed at its lower end, as shown. If the suction in riser 14 becomes greater than the submergence of tube 28 below the overflow, air is drawn in through the latter, relieving the suction and preventing flooding of the apparatus.

According to the preferred construction, tube 28 is closed at its lower end and is provided with a small opening 28' at a slight distance from the bottom. This small opening acts as a choke to prevent rapid surges and, being up off the bottom, dirt which may settle in the tube will not be likely to clog it. In this connection, the extent of submergence of tube 28 is to be noted; according to the invention, the submergence preferably is greater than distance "a" but is less than the distance from the water level in reservoir 18 to the level in meter overflow chamber 24. In practice, it is halfway between these two distances.

In the event that the solution discharge conduit 16 becomes plugged or because of other disturbances in the regular operation of the injector, water can come back through the side opening of the injector. To take care of such back flow, reservoir 18 is provided with an overflow 22.

In order to insure a proper supply of water, i. e. sufficient water to dissolve all the chlorine supplied during operation of the chlorinator, a water control which corresponds substantially to the chlorine flow is provided, as follows:

Diaphragm valve 32 is interposed in conduit 17, as shown. A minor flow conduit 33 extends from conduit 17, anterior to valve 32, to an intermediate point in the conduit extending between orifices 12 and 13. Cut into conduit 33 are, first, an orifice 34 and, secondly, a diaphragm valve 35. A conduit 36 extends from the discharge side of orifice 34 to the chamber of valve 32 on the back of the diaphragm. Finally, another conduit 37 extends from the chamber of valve 35, on the front of the diaphragm, to the bottom of overflow chamber 24. Orifice 38 is cut into conduit 37, and orifice 39 is cut into conduit 17 between valve 32 and conduit 33.

The pressure differential established at orifice 13 is used to set up a minor flow of water through conduit 33 proportional to the flow of chlorine through the apparatus. This is accomplished by means of valve 35 and orifice 38. Valve 35 is constructed so as to maintain water pressure on the face of its diaphragm substantially equal to the chlorine pressure on the back of the diaphragm, and the latter pressure is, of course, equal to the pressure on the inlet of orifice 13, as is apparent from the drawings. This pressure also prevails on the inlet of orifice 38. The pressure on the discharge of orifice 38 is equal to the pressure on the discharge of orifice 13, due to the overflow arrangement hereinbefore described. The overflow level and the level of valve 35 are so arranged that the hydrostatic pressure on the two sides of orifice 38 are balanced. The resultant proportional minor flow passes through orifice 34.

The pressure on the inlet of orifice 34 is equal to the pressure in the main water supply. The pressure on the discharge of orifice 34 is transmitted to the back of diaphragm valve 32. The pressure on the inlet of orifice 39 is equal to the pressure on the inlet of orifice 34. The pressure on the discharge of orifice 39 is transmitted to the face of the diaphragm of valve 32. The latter is built to maintain the latter pressure substantially equal to the pressure on the back of the diaphragm. It therefore maintains the main flow through orifice 39 to the chlorinator proportional to the minor flow through orifice 34 which, in turn, is proportional to the chlorine flow through orifice 13. There is thus insured a flow of water which is at least proportional to the flow of chlorine. The relationship of this proportion can be controlled by regulating the relative sizes of orifices 34 and 39, which, moreover, may be variable in character.

Figure 2:
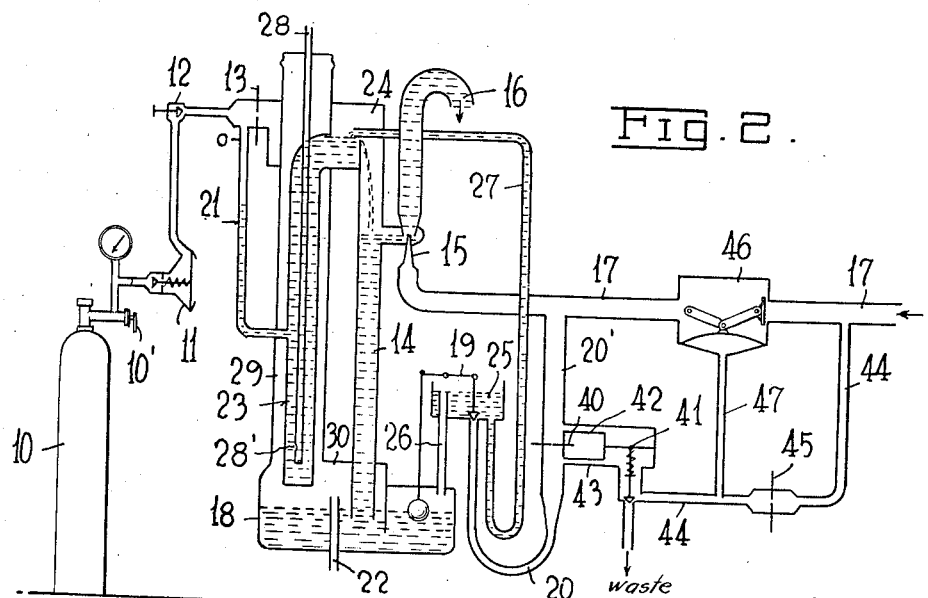
Fig. 2 is a diagrammatic representation of a second embodiment of the invention.

Referring now to the embodiment of the invention shown in Figure 2 of the drawings, it is to be noted that parts which correspond to parts included in the embodiment according to Figure 1 have been designated with corresponding reference numerals. In accordance with the embodiment according to Figure 2, means are provided to insure a sufficient supply of water to properly operate the injector or choke 15.

To this end, an orifice 40 is provided, as shown, in conduit 20', through which water may flow to the injector choke 15. As long as water is taken into the latter, the injector has ample pulling power to take all the chlorine being fed. When the supply falls below normal, the aforementioned means comes into play.

This means comprises a diaphragm dump valve 41 which leads to waste or to any other suitable disposal means. Conduit 42 extends from the discharge side of orifice 40 to the back of the diaphragm of valve 41, and conduit 43 extends from the inlet side of orifice 40 to the front of the diaphragm of valve 41. The latter is constructed in such manner that when the head across orifice 40 falls below a certain minimum, valve 41 opens allowing the flow of water from 17 through conduit 44 to flow to waste. Intermediate the ends of conduit 44, there is interposed an orifice 45, so that when valve 41 is open (i. e. when insufficient water is being supplied through 17), the pressure between orifice 45 and valve 41 drops appreciably. Diaphragm-actuated toggle valve 46 is interposed in conduit 17, as shown, and conduit 47 extends between this valve and a point in conduit 44 intermediate orifice 45 and valve 41. Valve 46 is so constructed that when pressure is exerted on its diaphragm from conduit 47 (i. e. when valve 41 is closed and there is a sufficient flow through 40), the valve is closed. When the said pressure on the diaphragm is reduced, indicating insufficient flow through 40, valve 46 opens farther allowing additional water to flow to the chlorinator, which water builds up the power of the chlorinator to carry away all the chlorine being fed.

Figure 3:
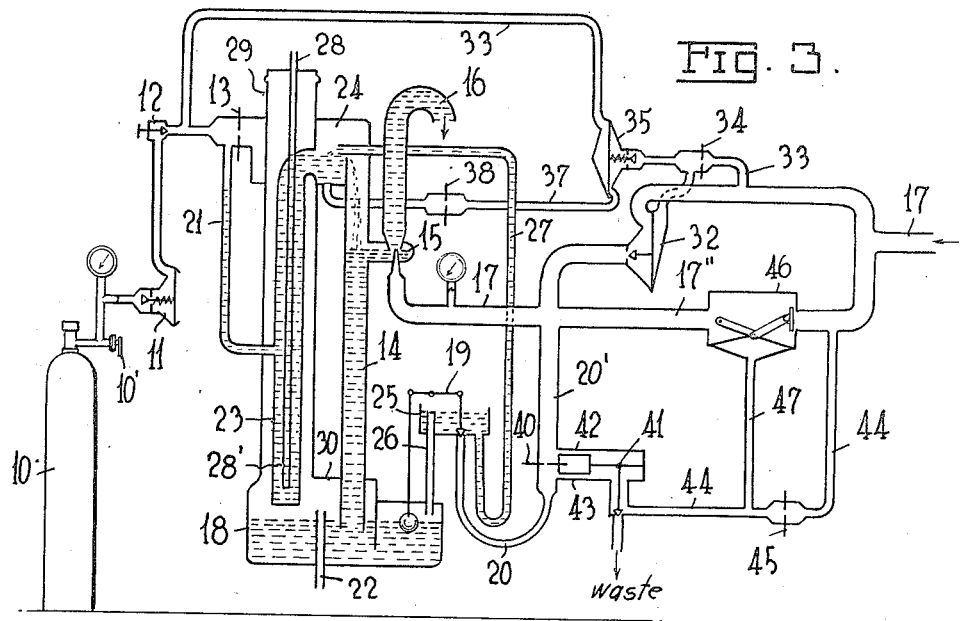
Fig. 3 is a diagrammatic representation of a third embodiment of the invention, wherein the features of the first two embodiments are combined.

The embodiment of Figure 3 is a combination into a single unit of the embodiments according to Figures 1 and 2, hereinbefore described. Conduit 17 is subdivided into two branches 17' and 17", which unite to form 17 at 31, valve 32 being cut into branch 17, and valve 46 being cut into branch 17". Operation of this embodiment of the invention will be understood from the description hereinbefore set forth. It will be seen that the arrangement according to Figure 3 insures the use of the minimum amount of water necessary for a satisfactory operation of the chlorinator, thus effecting an important economy or saving in water; it also insures at least a proportional flow of water in accordance with the chlorine flow; and, finally, it insures a sufficient flow of water through the aspirator or solution device to enable the latter to carry away all the chlorine being fed to it.

Figure 4:
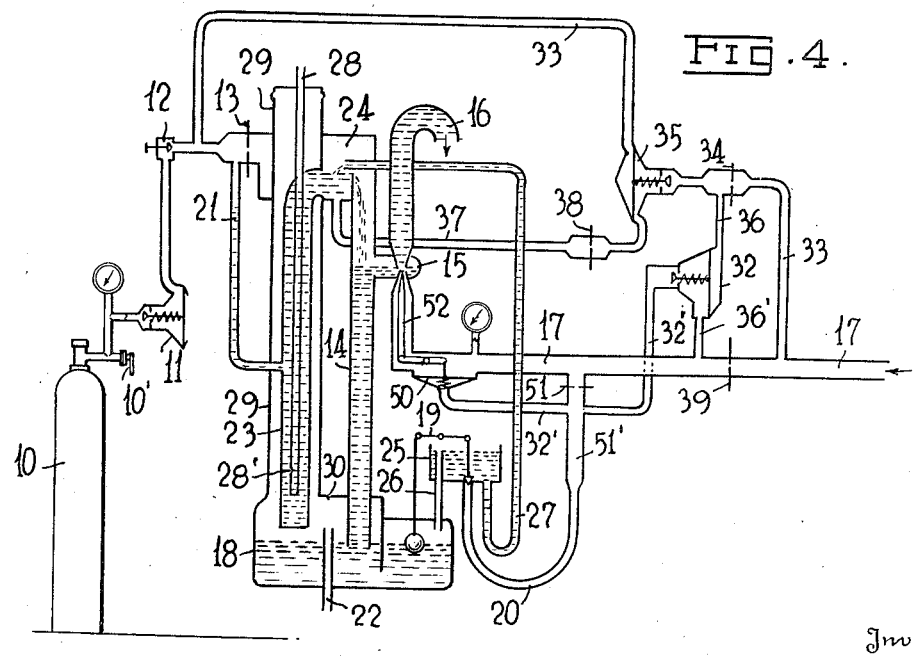
Fig. 4 is a diagrammatic representation of still another form of the invention.

Figure 4 illustrates a further embodiment of the invention whereby the power available at the solution device or injector can be reduced only proportionately to the amount of water passing.

Here again, parts which are duplicated in the embodiments shown in Figures 1, 2 and 3 are designated by corresponding reference characters.

According to this form of the invention, the size of the jet of the solution device is controlled. If desired, the size of the throat and of the tail of the aspirator or the like device may also be varied. The size of the jet opening at 15 is controlled by member 50, which preferably assumes the form of a diaphragm with a slight unbalance thereon. One side of diaphragm 50 is in contact with the water supply through conduit 32', while the other side of diaphragm 50 is in contact with the main supply to the choke. An orifice 51 is arranged in conduit 51' which extends between conduit 17 and conduit 32', and this orifice is of such size that the flow therethrough is adequate to insure that the aspirator 15 is taking enough water in through the choke to take care of the chlorine being fed thereto. Variations in this flow produce corresponding variations in the differential therethrough and corresponding displacements of diaphragm 50 whereby the solution device is more or less throttled, as required, by means of the linked throttle device 52 which is associated with diaphragm 14 in suitable and/or conventional manner.

If the water pressure is sufficiently high, the amount of water supplying the quantity of power necessary to take care of the chlorine may be insufficient to dissolve the chlorine being fed. To insure sufficient water for the latter, a minor flow of water is set up through orifice 38 which is proportional to the chlorine flow through orifice 13, as in the embodiment of Figure 1, this flow passing through orifice 34. Diaphragm valve 32 is interposed in conduit 36, 36'; conduit 36 extending from the discharge side of orifice 34 to the face of the diaphragm, and conduit 36' extending from the back of the diaphragm to conduit 17. Orifice 39 is interposed in the latter intermediate conduits 33 and 36'.

If the flow through orifice 39 is proportionately less than the flow through orifice 34, valve 32 opens and allows water to by-pass orifice 51 into the connection to the choke increasing the pressure in this connection. This increased pressure acts on diaphragm 50, withdrawing member 52 and allowing a greater quantity of water to pass through to the solution device, thus ensuring a flow through the latter which is at least proportional to the chlorine flow through orifice 13. The exact ratio can, of course, be varied by adjusting the relative sizes of orifices 34 and 39.

Having disclosed the invention, what is claimed is:

1. In a chlorinator, a source of supply of gas under pressure, a solution device, means for conveying gas from the former to the latter, said means including a meter orifice, means for controlling the flow of gas through said meter orifice, a source of supply of water, conduit means for conveying a main flow of water from the latter to said solution device, a diaphragm valve interposed in said last-named conduit means, a minor flow conduit extending from said main flow conduit means to a point posterior to said meter orifice, said minor flow conduit comprising an orifice, means for regulating the flow through said last-named orifice in such manner that it is substantially proportional to the flow through the meter orifice, and means for maintaining the main flow of water through said diaphragm valve substantially proportional to the said proportional minor flow.

2. Apparatus adapted to be used in the treatment of material with a gas, comprising a source of supply of gas, a solution device to which said gas is fed, said solution device including a water-operated aspirator, means for feeding water to said solution device, a reducing valve adjacent the source of supply of gas for reducing the pressure of the latter to a substantially constant magnitude, a variable orifice and a calibrated orifice arranged in series between said reducing valve and said solution device, said variable orifice being anterior to said calibrated orifice, means for determining the pressure on the discharge side of said calibrated orifice, said means including a column of water raised to a certain height by said aspirator, means for maintaining said height substantially constant, and means for maintaining the feed of water to said solution device at least proportional to the feed of gas thereto.

3. In apparatus of the character described particularly adapted to provide and control a supply of gas in the form of an aqueous solution thereof to a body of material to be treated, a source of supply of gas, a source of supply of water, a solution device to which said gas and water are supplied in controlled amount, said solution device comprising a water-actuated jet aspirator, means for regulably controlling the supply of gas and means for regulably controlling the supply of water, said last-named means comprising means for varying the size of the jet of the solution device in accordance with the supply of water thereto.

4. Gas feeding and control apparatus including a source of supply of gas and a source of supply of water, a solution device including a water-actuated jet aspirator for effecting solution of the gas in the water, means for conveying the resultant solution from said solution device to a point of consumption thereof, means for regulably controlling the rate of flow of gas to said solution device and means for regulably controlling the supply of water thereto, said last-named means including control means for correlating the feed of water to the feed of gas, said control means being so constructed and arranged as to ensure a sufficient supply of water to enable the aspirator to carry away all the gas being fed thereto, to maintain the feed of water at least proportional to the feed of gas, and to vary the size of the aspirator jet in accordance with the feed of gas and water.

5. In apparatus for treating material with a gas in the form of an aqueous solution thereof, a solution device, a gas supply conduit for supplying gas to said solution device, a main water supply conduit for supplying water to said solution device, and means for controlling said water supply so that it corresponds substantially to said gas supply, said control means including a minor flow conduit extending between said main water supply conduit and said gas supply conduit, means for establishing a minor flow of water through said minor flow conduit proportional to the flow of gas through said gas supply conduit, and means for maintaining the flow of water through said main water supply conduit proportional to the minor flow through said minor flow conduit.

6. In apparatus for treating material with a gas in the form of an aqueous solution thereof, a pressure-actuated solution device, a gas supply conduit for supplying gas to said solution device, a main water supply conduit for supplying water under pressure to said solution device, and means for controlling said water supply so that it corresponds substantially to said gas supply, said control means including a minor flow conduit extending between said main water supply conduit and said gas supply conduit, said minor flow conduit being provided with a first orifice, means for establishing a minor flow of water through said minor flow conduit and said orifice proportional to the flow of gas through said gas supply conduit, said main water supply conduit being provided with a second orifice, and means for maintaining the flow of water through said second orifice proportional to the flow through said first orifice.

7. In apparatus for treating material with a gas in the form of an aqueous solution thereof, a pressure-actuated solution device, a gas supply conduit for supplying gas to said solution device, said gas supply conduit being provided with a gas metering orifice, a main water supply conduit for supplying water under pressure to said solution device, and means for controlling said water supply so that it corresponds substantially to said gas supply, said control means including a minor flow conduit extending between said main water supply conduit and a point on said gas supply conduit posterior to said metering orifice, said minor flow conduit being provided with a variable orifice, means for establishing a minor flow of water through said minor flow conduit and said variable orifice proportional to the flow of gas through said metering orifice, said last-named means comprising a variable orifice arranged in said minor flow conduit in spaced relationship to said first-named variable orifice, a diaphragm valve interposed in said minor flow conduit intermediate said variable orifices, and a conduit interconnecting the anterior side of said metering orifice and the rear of the diaphragm of said valve, and means for maintaining the flow of water through said main water supply conduit proportional to the minor flow through said minor flow conduit.

8. In apparatus for treating material with a gas in the form of an aqueous solution thereof, a pressure-actuated solution device, a gas supply conduit for supplying gas to said solution device, said gas supply conduit being provided with a gas metering orifice, a main water supply conduit for supplying water under pressure to said solution device, and means for controlling said water supply so that it corresponds substantially to said gas supply, said control means including a minor flow conduit extending between said main water supply conduit and a point on said gas supply conduit posterior to said metering orifice, said minor flow conduit being provided with an orifice, means for establishing a minor flow of water through said minor flow conduit and said last-mentioned orifice proportional to the flow of gas through said metering orifice, said last-named means comprising an orifice arranged in said minor flow conduit in spaced relationship to said first-named orifice in said minor flow conduit, a diaphragm valve interposed in said minor flow conduit intermediate the orifices therein, and a conduit interconnecting the anterior side of said metering orifice and the rear of the diaphragm of said valve, and means for maintaining the flow of water through said main water supply conduit proportional to the minor flow through said minor conduit, said last-named means including an orifice interposed in said main water supply conduit at a point posterior to the connection with said minor flow conduit, and a diaphragm valve interposed in said main water supply conduit posterior to said last-named orifice, and a conduit interconnecting the rear of the diaphragm of said last-named diaphragm valve and the discharge side of said first-named orifice in said minor flow conduit.

9. Apparatus for treating material with a gas in the form of an aqueous solution thereof, comprising a source of supply of gas, a source of supply of water, a solution device to which said gas is fed, means for conveying gas from said source of gas supply to said solution device, said device including a water-operated aspirator, a supply conduit through which water is supplied to said aspirator from said source of supply of water, an orifice arranged in said conduit, a second conduit for supplying water to said aspirator, a pressure-actuated valve in said second conduit, and means for actuating said pressure-actuated valve in accordance with the head across said orifice.

10. Apparatus for treating material with a gas in the form of an aqueous solution thereof, comprising a source of supply of gas, a source of supply of water, a solution device to which said gas is fed and from which the solution is withdrawn to the point of treatment, means for conveying gas from said source of gas supply to said solution device, said solution device including a water-operated aspirator, a first supply conduit through which water is normally supplied to said aspirator from said source of supply of water, a second supply conduit also adapted to supply water to said aspirator, a valve normally closing said second supply conduit, and means for automatically opening said valve and for augmenting the supply of water to said solution device through said second conduit when the supply through the first conduit becomes inadequate to dissolve all the gas being fed to said solution device.

11. Apparatus for treating material with a gas in the form of an aqueous solution thereof, comprising a source of supply of gas, a source of supply of water, a solution device to which said gas is fed, means for conveying gas from said source of gas supply to said solution device, said device including a water-operated aspirator, a supply conduit through which water is supplied to said aspirator from said source of supply of water, an orifice arranged in said conduit, a second conduit for supplying water to said aspirator, a pressure-actuated valve in said second conduit, and means for actuating said pressure-actuated valve in accordance with the head across said orifice, said means comprising a dump valve associated with said orifice and so constructed and arranged as to open when said head falls below a certain minimum, said pressure-operated valve being opened when said dump valve is open and being closed when the dump valve is closed.

12. Apparatus for treating material with a gas in the form of an aqueous solution thereof, comprising a source of supply of gas, a source of supply of water, a solution device to which said gas is fed and from which it is withdrawn in the form of a solution to the point of treatment, means for conveying gas from said source of gas supply to said solution device, primary means for supplying water to said aspirator from said source of supply of water, secondary means communicating with said primary means at a point anterior to said aspirator for supplying water thereto, and control means for feeding the water through said secondary means when the supply through said primary means becomes inadequate to dissolve all the gas being fed to said solution device.

13. Gas feeding and control apparatus including a source of supply of gas, a source of supply of water, a solution device including a water-actuated aspirator, means for conveying gas from said source of gas supply to said solution device, means for conveying water from said source of water supply to said aspirator, said last-named means including a first conduit through which said water normally flows to said aspirator, a second conduit which is normally closed, said second conduit being cut into said first conduit anteriorly of said aspirator, valve means normally closing said second conduit, means for automatically opening said valve means whenever the flow of water through said first conduit becomes inadequate to dissolve all the gas being fed to said solution device, and means for maintaining the feed of water to the solution device at least proportional to the feed of gas thereto.

HOWARD J. PARDEE.